US011098260B2

(12) United States Patent
Johnston et al.

(10) Patent No.: US 11,098,260 B2
(45) Date of Patent: Aug. 24, 2021

(54) CHEMICAL WARFARE AGENTS AND RELATED COMPOUNDS AS FUEL FOR INTERNAL COMBUSTION ENGINES

(71) Applicant: Southwest Research Institute, San Antonio, TX (US)

(72) Inventors: Darrel W. Johnston, Boerne, TX (US); Monica R. Medrano, San Antonio, TX (US); Daniel Moreland, San Antonio, TX (US); Michael MacNaughton, San Antonio, TX (US); Matthew S. Blais, San Antonio, TX (US); Jimell Erwin, San Antonio, TX (US)

(73) Assignee: SOUTHWEST RESEARCH INSTITUTE, San Antonio, TX (US)

( * ) Notice: Subject to any disclaimer, the term of this patent is extended or adjusted under 35 U.S.C. 154(b) by 0 days.

(21) Appl. No.: 16/421,450

(22) Filed: May 23, 2019

(65) Prior Publication Data

US 2019/0359904 A1 Nov. 28, 2019

Related U.S. Application Data

(60) Provisional application No. 62/675,725, filed on May 23, 2018.

(51) Int. Cl.
*C10L 1/02* (2006.01)
*F02M 26/15* (2016.01)
(Continued)

(52) U.S. Cl.
CPC .............. *C10L 10/00* (2013.01); *B01D 53/40* (2013.01); *B01D 53/75* (2013.01); *B01D 53/76* (2013.01);
(Continued)

(58) Field of Classification Search
CPC .... C10L 1/02; C10L 1/198; C10L 2200/0492; C10L 2290/02; C10L 1/1817; C10L 1/221; F02M 26/15
See application file for complete search history.

(56) References Cited

U.S. PATENT DOCUMENTS 4,400,936 A 8/1983 Evans
4,681,072 A 7/1987 Pouring
(Continued)

OTHER PUBLICATIONS

Defense Advanced Research Projects Agency—Program for Transforming Deadly Chemichals into Harmless Dirt Gets Underway <<https://www.darpa.mil/news-events/2015-12-09>> accessed May 23, 2018 (4 pgs).

(Continued)

*Primary Examiner* — Long T Tran
(74) *Attorney, Agent, or Firm* — Grossman, Tucker, Perreault & Pfleger, PLLC (57) ABSTRACT

Technologies for combusting hazardous compounds such as chemical warfare agents and related compounds are disclosed. In embodiments, the technologies include systems and methods for combusting such compounds in an internal combustion engine, such as a spark ignition internal combustion engine, a diesel engine, or the like. The technologies described herein further include components for treating an exhaust gas stream produced by combustion of hazardous compounds. In embodiments such components include a scrubber that utilizes a scrubbing media such as soil to removing acid gases from the exhaust stream.

22 Claims, 1 Drawing Sheet

(51) Int. Cl.
| | |
|---|---|
| *C10L 10/00* | (2006.01) |
| *C10L 1/08* | (2006.01) |
| *C10L 1/24* | (2006.01) |
| *C10L 1/222* | (2006.01) |
| *C10L 1/26* | (2006.01) |
| *F02B 43/12* | (2006.01) |
| *F02D 19/02* | (2006.01) |
| *F02D 19/06* | (2006.01) |
| *F02D 41/00* | (2006.01) |
| *B01D 53/92* | (2006.01) |
| *B01D 53/83* | (2006.01) |
| *B01D 53/40* | (2006.01) |
| *B01D 53/76* | (2006.01) |
| *B01D 53/75* | (2006.01) |
| *C10L 1/06* | (2006.01) |

(52) U.S. Cl.
CPC ............. *B01D 53/83* (2013.01); *B01D 53/92* (2013.01); *C10L 1/06* (2013.01); *C10L 1/08* (2013.01); *C10L 1/2222* (2013.01); *C10L 1/2406* (2013.01); *C10L 1/2633* (2013.01); *F02B 43/12* (2013.01); *F02D 19/022* (2013.01); *F02D 19/025* (2013.01); *F02D 19/0623* (2013.01); *F02D 19/0642* (2013.01); *F02D 41/008* (2013.01); *F02M 26/15* (2016.02); *B01D 2258/012* (2013.01); *C10L 2270/023* (2013.01); *C10L 2270/026* (2013.01)

(56) References Cited

U.S. PATENT DOCUMENTS

| | | | |
|---|---|---|---|
| 5,692,458 A | 12/1997 | Green | |
| 8,936,011 B2 | 1/2015 | Bruns | |
| 9,500,144 B1 | 11/2016 | Steen et al. | |
| 9,784,192 B2 | 10/2017 | Steen et al. | |
| 9,856,770 B2 | 1/2018 | Bruns | |
| 2005/0042151 A1* | 2/2005 | Alward | F01N 3/30 422/177 |
| 2006/0053791 A1* | 3/2006 | Prentice, III | F23G 5/006 60/645 |
| 2010/0048975 A1* | 2/2010 | Uhm | A62D 3/178 588/311 |
| 2010/0064952 A1* | 3/2010 | Brown | F01D 1/32 110/263 |
| 2010/0199559 A1* | 8/2010 | Hallett | C01B 3/586 48/127.7 |
| 2013/0266902 A1* | 10/2013 | Campbell | F02C 6/00 431/4 |
| 2014/0311018 A1* | 10/2014 | Warnqvist | C11C 3/003 44/306 |
| 2018/0355265 A1* | 12/2018 | Price | C10L 1/02 |

OTHER PUBLICATIONS

Researchers Developing Portable System to Neutralize Chemical Threats <<https://www.stripes.com/news/researchers-developing-portable-system->> accessed May 23, 2018 (8 pgs).

"SwRI-Developed Mobile System to Destroy Dangerous Chemical Warefare Agents on Site"; Advanced Science. Applied Technology <<https://www.swri.org/press-release/swri-developed-mobile-system-destroy>> accessed May 23, 2018 (2 pgs).

Defense Advanced Research Projects Agency "System to Turn Deadly Chemichals into Harmless Dirt Makes Advances"; <<https://www.darpa.mil/news-events/2017-04-14>> accessed May 23, 2020 (3 pgs).

Chemical Weapons Demilitarization 2017 Conference, International, London, UK; Darrel Johnston, SwRI: Presentation Title: "Reforming Engine with Soil Bed Post Treatment for the Destruction of Chemical Warfare Agents," Abstract p. 26 <<https://cwdlondon2017.weebly.com/uploads/8/1/4/9/81499780/abstract_booklet_2017.pdf>> accessed Apr. 3, 2020.

Chemical Weapons Demilitarization 2017 Conference, International, London, UK; Matthew Blais, SwRI; Presentation Title: "Preliminary Soil Capacity Performance Test in Support of Agnostic Compact Demilitarization of Chemical Agents"; Abstract p. 32 <<https://cwdlondon2017.weebly.com/uploads/8/1/4/9/81499780/abstract_booklet_2017.pdf>> accessed Apr. 3, 2020.

Chemical Weapons Demilitarization 2017 Conference, International, London, UK Monica Medrano, SwRI; Presentation Title: "S3 Solid Scrubber System Safely Removing Acidic CWA Decomposition Effluent without Water"; Abstract p. 34 <<https://cwdlondon2017.weebly.com/uploads/8/1/4/9/81499780/abstract_booklet_2017.pdf>> accessed Apr. 3, 2020.

* cited by examiner

CHEMICAL WARFARE AGENTS AND RELATED COMPOUNDS AS FUEL FOR INTERNAL COMBUSTION ENGINES

STATEMENT OF RELATED APPLICATIONS

This application claims benefit of priority to U.S. Provisional Application No. 62/675,725, filed May 23, 2018, the entire content of which is incorporated herein by reference.

GOVERNMENT SUPPORT CLAUSE

This disclosure was made with United States Government support under Contract No. W911NF15C0232 from the Defense Advanced Research Projects Agency. The Government has certain rights in this disclosure.

FIELD

The present disclosure is directed at the use of chemical warfare agents (CWAs) and/or related compounds as a fuel for an internal combustion engine. In particular chemical warfare agents and/or related compounds are incorporated as a fuel component in an internal combustion engine which combustion is then optimized. Engine exhaust, which is primarily acidic, is also selectively treated to reduce the output of acid gases.

BACKGROUND

Non-volatile toxic chemicals such as polychlorinated biphenyls (PCB) have been destroyed in a diesel internal combustion engine (D-ICE) and residual vapors containing HCl scrubbed by a variety of columns before being released into the atmosphere. U.S. Pat. No. 4,400,936 reports on the mixing of diesel with PCB in a quantity sufficient to produce a combustible mixture that is injected into the engine for PCB destruction.

Internal combustion engines have been proposed for destruction of volatile organic compounds (VOC). U.S. Pat. No. 4,681,072 discloses a halogenated hydrocarbon fuel that is aspirated into a spark initiated internal combustion engine (SI-ICE) along with a support hydrocarbon fuel such as gasoline and burned in a variable volume first reciprocating piston chamber and transmitted to a secondary graphite coated cylinder to complete the conversion into a hydrogen halide and completely oxidized hydrocarbons. The hydrogen halide was proposed to subsequently be removed from the exhaust by known methods. U.S. Pat. No. 5,692,458 discloses that volatile organic compounds are also burned in an ICE (diesel, gasoline, etc., fueled) and injection rate into the intake air is controlled by a sensor system which monitors the success of the combustion in the exhaust stream. U.S. Pat. No. 8,936,011B2 reports on a VOC consuming ICE engine that is connected to a secondary ICE engine through a variable resistance, fluid coupled drive shaft to optimize VOC destruction with minimum energy expenditure.

U.S. Pat. Nos. 9,500,144 and 9,784,192 couples a VOC burning ICE with an electric generator which provides power to a VOC concentrating unit operating immediately upstream from the ICE engine. Further improvements in VOC destruction in an ICE is described in U.S. Pat. No. 9,856,770 where a manifold containing a catalytic converter uses engine heat to complete destruction of the injected VOC.

A need remains for systems, devices, and methods that may efficiently utilize chemical warfare agents as a fuel ingredient to otherwise convert the chemical energy of such agents for more useful non-warfare purposes. In addition, a need remains for systems, devices, and methods that efficiently combust chemical warfare agents and control/treat the (e.g., acidic) exhaust gases that are produced by combustion of such agents.

SUMMARY

The present disclosure is directed to systems and methods that use chemical warfare agents (CWAs) and/or related compounds (CWA precursors) and/or pesticides as a fuel for an internal combustion engine. The disclosed methods include combustion of CWAs and/or related compounds and/or pesticides in an internal combustion engine. Such methods may include, for example, introducing at least one CWA and/or related compound into the combustion chamber of an internal combustion engine, compressing the CWA and/or related compound, igniting and burning the CWA and/or related compound to form combustion reaction products and discharging the combustion reaction products from the combustion chamber.

DETAILED DESCRIPTION

Figure 1:
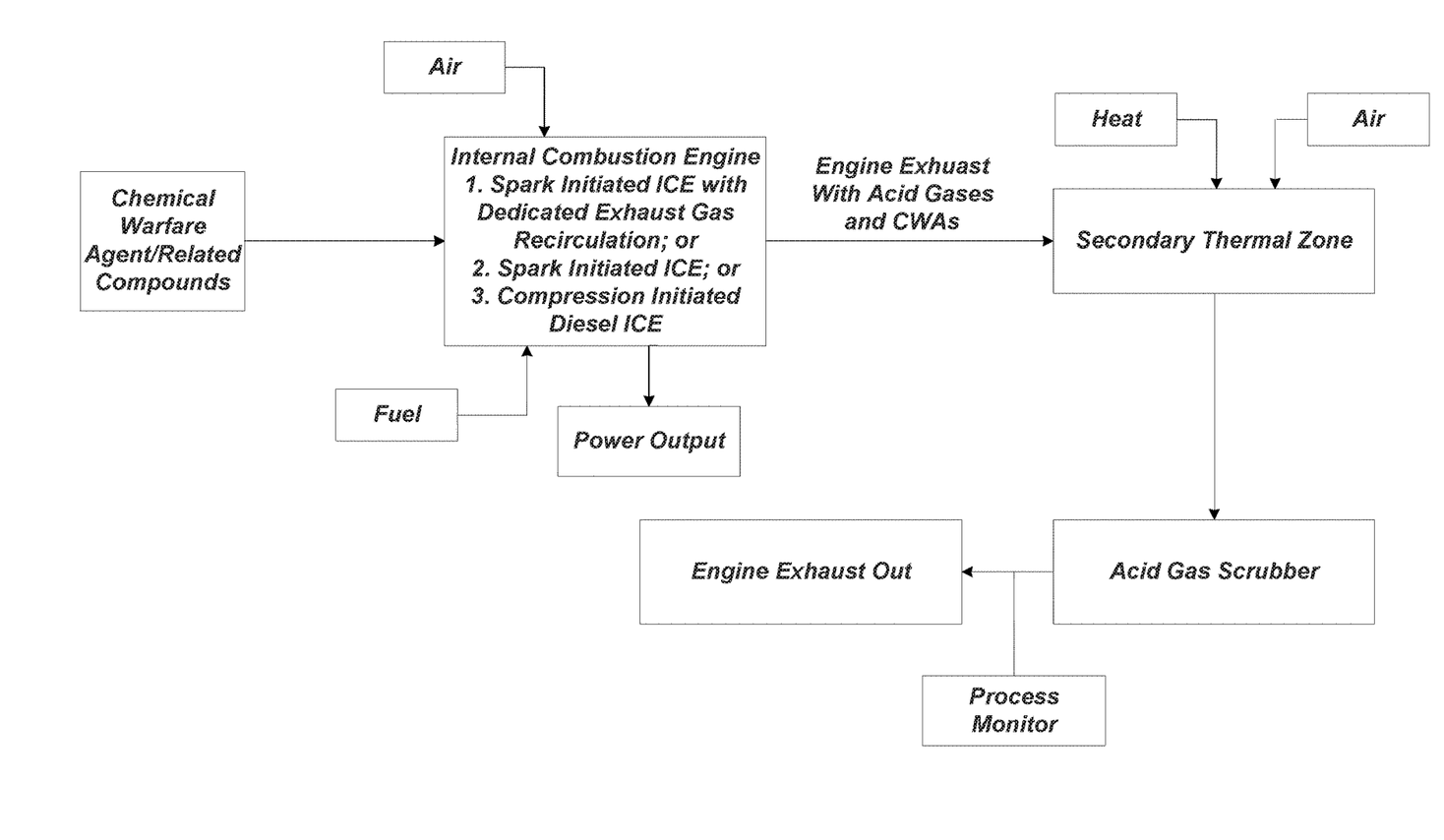
FIG. 1 is an overview of a system for combustion of chemical warfare agents and/or related compounds in an internal combustion engine.

Table 1 identifies various CWAs and other related compounds that are contemplated for combustion herein. As can be seen, a chemical warfare agent is a chemical substance whose toxic properties are utilized to kill, injure or incapacitate human beings.

As used herein, the term "related compounds" refers to the precursors of CWAs identified in Table 1 and the ensuing paragraphs. As can be seen, the CWAs and related compounds contain one or more of the following elements: nitrogen, sulfur, or phosphorus. Combustion of such compounds in an ICE is achieved by the technology of the present disclosure, e.g., by including such compounds as a fuel in an ICE as part of a fuel blend.

TABLE 1

CWAs & Related Compounds For Combustion
Toxic Chemicals

| No | Compound | Chemical Abstract Service (CAS) Number |
|---|---|---|
| 1 | O-Alkyl ($\leq$C10, incl. cycloalkyl) alkyl (Me, Et, n-Pr or i-Pr)-phosphonofluoridates | |
| e.g. | Sarin: O-Isopropyl methylphosphonofluoridate | (107-44-8) |
|  | Soman: O-Pinacolyl methylphosphonofluoridate | (96-64-0) |
| 2 | O-Alkyl ($\leq$C10, incl. cycloalkyl) N,N-dialkyl (Me, Et, n-Pr or i-Pr) phosphoramidocyanidates | |
| e.g. | Tabun: O-Ethyl N,N-dimethyl phosphoramidocyanidate | (77-81-6) |
| 3 | O-Alkyl (H or $\leq$C10, incl. cycloalkyl) S-2-dialkyl (Me, Et, n-Pr or i-Pr)-aminoethyl alkyl (Me, Et, n-Pr or i-Pr) phosphonothiolates and corresponding alkylated or protonated salts | |
| e.g. | VX: O-Ethyl S-2-diisopropylaminoethyl methyl phosphonothiolate | (50782-69-9) |
| 4 | Sulfur mustards: | |

TABLE 1-continued

CWAs & Related Compounds For Combustion Toxic Chemicals

| No | Compound | Chemical Abstract Service (CAS) Number |
|---|---|---|
|  | 2-Chloroethylchloromethylsulfide | (2625-76-5) |
|  | Mustard gas: Bis(2-chloroethyl)sulfide | (505-60-2) |
|  | Bis(2-chloroethylthio)methane | (63869-13-6) |
|  | Sesquimustard: 1,2-Bis(2-chloroethylthio)ethane | (3563-36-8) |
|  | 1,3-Bis(2-chloroethylthio)-n-propane | (63905-10-2) |
|  | 1,4-Bis(2-chloroethylthio)-n-butane | (142868-93-7) |
|  | 1,5-Bis(2-chloroethylthio)-n-pentane | (142868-94-8) |
|  | Bis(2-chloroethylthiomethyl)ether | (63918-90-1) |
|  | O-Mustard: Bis(2-chloroethylthioethyl)ether | (63918-89-8) |
| 5 | Nitrogen mustards: |  |
|  | HN1: Bis(2-chloroethyl)ethylamine | (538-07-8) |
|  | HN2: Bis(2-chloroethyl)methylamine | (51-75-2) |
|  | HN3: Tris(2-chloroethyl)amine | (555-77-1) |
| 6 | Phosgene: Carbonyl dichloride | (75-44-5) |
| 7 | Cyanogen chloride | (506-77-4) |
| 8 | Hydrogen cyanide | (74-90-8) |
| 9 | Chloropicrin: Trichloronitromethane | (76-06-2) |
| 10 | BZ: 3-Quinuclidinyl benzilate (dissolved within an organic solvent) | (6581-06-2) |
|  | Precursors |  |
| 11 | Alkyl (Me, Et, n-Pr or i-Pr) phosphonyldifluorides |  |
| e.g. | DF: Methylphosphonyldifluoride | (676-99-3) |
| 12 | O-Alkyl (H or <=C10, incl. cycloalkyl) O-2-dialkyl (Me, Et, n-Pr or i-Pr)-aminoethyl alkyl (Me, Et, n-Pr or i-Pr) phosphonites and corresponding alkylated or protonated salts |  |
| e.g. | QL: O-Ethyl O-2-diisopropylaminoethyl methylphosphonite | (57856-31-8) |
| 13 | Chlorosarin: O-Isopropyl methylphosphonochloridate | (1445-76-7) |
| 14 | Chlorosoman: O-Pinacolyl methylphosphonochloridate | (7040-57-5) |
| 15 | Amiton: O,O-Diethyl S-[2-(diethylamino)ethyl] phosphorothiolate and corresponding alkylated or protonated salts | (78-53-5) |
| 16 | PFIB: 1,1,3,3,3-Pentafluoro-2-(trifluoromethyl)-1-propene | (382-21-8) |
|  | Chemicals, containing a phosphorus atom to which is bonded one methyl, ethyl or propyl (normal or iso) group but not further carbon atoms, |  |
| e.g. 17 | Methylphosphonyl dichloride | (676-97-1) |
|  | Dimethyl methylphosphonate | (756-79-6) |
| 18 | O-Ethyl S-phenyl ethylphosphonothiolothionate | (944-22-9) |
| 19 | N,N-Dialkyl (Me, Et, n-Pr or i-Pr) phosphoramidic dihalides |  |
| 20 | Dialkyl (Me, Et, n-Pr or i-Pr) N,N-dialkyl (Me, Et, n-Pr or i-Pr)-phosphoramidates |  |
| 21 | N,N-Dialkyl (Me, Et, n-Pr or i-Pr) aminoethyl-2-chlorides and corresponding protonated salts |  |
| 22 | N,N-Dialkyl (Me, Et, n-Pr or i-Pr) aminoethane-2-ols and corresponding protonated salts |  |
| 23 | N,N-Dialkyl (Me, Et, n-Pr or i-Pr) aminoethane-2-thiols and corresponding protonated salts |  |
| 24 | Thiodiglycol: Bis(2-hydroxyethyl)sulfide | (111-48-8) |
| 25 | Pinacolyl alcohol: 3,3-Dimethylbutan-2-ol | (464-07-3) |
| 26 | Trimethyl phosphite | (121-45-9) |
| 27 | Triethyl phosphite | (122-52-1) |
| 28 | Dimethyl phosphite | (868-85-9) |
| 29 | Diethyl phosphite | (762-04-9) |
| 30 | Sulfur monochloride | (10025-67-9) |
| 31 | Sulfur dichloride | (10545-99-0) |
| 32 | Thionyl chloride | (7719-09-7) |
| 33 | Ethyldiethanolamine | (139-87-7) |
| 34 | Methyldiethanolamine | (105-59-9) |
| 35 | Triethanol amine | (102-71-6) |

The fuels described herein may include one or more CWAs and/or related compounds, optionally in combination with a hydrocarbon fuel such as gasoline, diesel, etc. In embodiments, the fuels described herein include a combination of a hydrocarbon fuel and one or more CWAs and/or related compounds, wherein the ratio of hydrocarbon fuel (HF) to CWA and/or related compounds ranges from 9:1 (HF:CWA or related compound) up to pure CWA or related compound. Put in different terms, the fuels described herein may include greater than or equal to about 10%, 20%, 30%, 40%, 50%, 60%, 70%, 80%, 90%, or even 100% of one or more CWAs and/or related compounds, wherein the balance (if any) is one or more hydrocarbon fuels such as gasoline or diesel fuel. In embodiments, the fuels described herein include 10-100% CWAs and/or related compounds, optionally in combination with gasoline or diesel fuel. In specific non-limiting embodiments, the fuels described herein include a hydrocarbon fuel mixed with one or more organophosphorus (OPCs) CWAs, which may be understood as those compounds that inhibit acetycholinesterase (AChE) activity. In such instances, the ratio of hydrocarbon fuel to the OPCs ranges from 9:1 (hydrocarbon fuel to CWA) to pure CWA.

In the case of relatively non-volatile chemical agents (e.g., mustard and some organophosphate agents) port injection (typical gasoline powered engine) into the air intake manifold to mix with incoming air and evaporate prior to the intake valve (PFI-port fuel injection) is not practical, as it can produce a gas mixture in the cylinder that is undesirably prone to auto-ignite on compression and either produce knock, or completely render the engine inoperable. To address such issues, it is preferable to use a mixture of one or more CWAs and diesel, wherein the mixture is adjusted in real-time with a controlled injection system so that the combustion process is continuously optimized throughout the destruction process through adjustment of engine control parameters, e.g. combustion phasing and engine load, in order to maintain a high rate and efficiency of CWA or related compound destruction, while staying within the operational limits of the system, e.g. cylinder pressure limits and engine load absorber limits The presence of CWA or related compound decomposition products in a flame (spark initiated or other) can change the flame burning characteristics/autoignition through the details of the chemical kinetics. The modification of the free radical reactions in the flame will depend upon the amount (e.g., percentage) of chemical warfare agent and/or related compound that is injected, with or without co-injection of a hydrocarbon fuel. Flame speed can be increased or decreased depending on the concentration of the chemical warfare agent or related compound, but is dependent upon the actual in-cylinder engine conditions and can vary greatly. In addition to unstable detonations (super-knock) and severe engine damage, less serious autoignitions might occur ahead of the spark plug initiated conflagration front (regular knock) at a given CWA and/or related compound concentration in a spark-ignition engine. Accordingly, the concentration of CWA and/or related compounds in the fuel (and/or the ratio of CWA and/or related compounds to hydrocarbon fuel) is preferably controlled so as to result in an overall resulting Anti-Knock Index level that is remains within the functional operational parameter of the engine—thereby avoiding knock at the desired operational point.

In the case of a diesel engine the CWA and/or related compound is preferably injected in advance of top dead center to induce some pre-ignition during the continued compression cycle, so that in-cylinder heat is maximized and engine shaft power is reduced. Accordingly, the CWA and/or related compound is preferably injected such that combustion is advanced to the point of maximizing in-cylinder temperatures while maintaining a positive brake mean effective pressure (BMEP) and not exceeding the in-cylinder pressure limits of the engine. As a diesel engine is much more robustly built than a SI-ICE, autoignitions can occur in a diesel engine at many locations in the highly compressed/high temperature aerosol/air mixture without engine damage. The ability to operate under less controlled autoignition conditions at higher temperatures and pressures is more amenable to pyrolysis and oxidative decomposition of the chemical agent.

The destruction of chemical agents containing phosphorous/sulfur in an ICE or flame represents a special challenge, because $P_2O_5$, $H_2PO_3$, $H_3PO_4$, oligomerized phosphoric acids, HF, HCl, $SO_2$, $H_2SO_3$, and/or $H_2SO_4$ can be produced by the flame. These relatively acidic molecules can compromise or destroy the "overbased" additives in engine oil, such as alkylsulfonate (or other anion) surfactant stabilized $Ca/Mg(CO_3)_x(OH)_y$ nanoparticles which are added to reduce engine corrosion. Engine oil destruction and gelling can also occur as a consequence. Downstream effects on Mo and Zn based tribological, oil additives can also affect engine wear/lifetime. These lubricating oil effects would occur in SI or diesel ICE. All of these effects can severely limit engine lifetime. This issue may be at least partially addressed by reducing/minimizing cylinder wall wetting with the CWA and/or related compound material. This may be accomplished, for example, through control of injection timing, duration and pressure such that the resulting spray's impingement on the cylinder walls is reduced/minimized. The method for and extent to which this can be done will vary based on the specifics of the engine. In general, the targeting of the injector should be in such a way to maximize entrainment of the spray into the incoming air charge and avoid impingement upon intake port, intake valve, cylinder wall, and piston top surfaces.

FIG. 1 provides an overview of a system for combustion of chemical warfare agents and/or related compounds in an internal combustion engine, consistent with the present disclosure. As shown, CWAs and/or related compounds (such as those noted herein) are consumed as fuel—along with air and a hydrocarbon fuel—in an internal combustion engine (ICE) such as a spark initiated or compression initiated ICE. The power output generated by combustion of the fuel by the ICE can be used to drive other components, such as an electrical generator. The gaseous engine exhaust produced by the ICE is preferably routed through an insulated or heated secondary thermal zone, optionally with additional air. The secondary thermal zone is configured to thermally decompose any remaining amount of CWAs or related compounds that did not combust in the ICE. Downstream of the secondary thermal zone, the exhaust gas stream remains relatively rich with acid gases. Consequently, the exhaust gas stream preferably enters into an acid gas scrubber, which is configured to remove acid gases (e.g., HCl, HF, $SO_2$, $H_2SO_3$, $H_2SO_4$, $P_2O_5$, $H_2PO_3$, $H_3PO_4$, and polyphosphoric acids) from the exhaust. In embodiments, the acid gas scrubber absorbs 99% to 99.99% of acid gases that enter the acid gas scrubber, e.g., from the secondary thermal zone or directly from the ICE. The removal of acid gases from the exhaust may be monitored and controlled with a process monitor. In embodiments, the exhaust downstream of the scrubber is comparable to typical automotive engine exhaust, and contains acid gases at a concentration of less than 5 ppm (i.e., from 0 to 5 ppm). In embodiments, all of the equipment of the system is disposed on or in a mobile platform, such as an automobile or trailer.

In one embodiment the ICE is a spark ignition (SI) ICE that includes two types of cylinders, wherein one (a first) cylinder type burns gasoline fuel under rich (fuel rich) conditions to produce an exhaust containing a reforming mixture of CO and $H_2$ which is then injected into the other (second) cylinder type, wherein the second cylinder type burns a mixture of gasoline and CWA and/or related compounds under lean (oxygen rich) conditions. In such embodiments the $H_2$ and CO produced by combustion of gasoline by the first cylinder type accelerates the flame front in the second cylinder type, and causes the combustion to occur closer to the wall of the second cylinder type—thereby increasing (e.g., maximizing) the efficiency with which the CWA and/or other related compound is destroyed. Such a process may be referred to herein as "Dedicated Exhaust Gas Recirculation" D-EGR.

Fuel and chemical warfare agent or related compounds may preferably be directly injected into the cylinder combustion chamber and/or injected into the intake port or any combination thereof may be employed, depending upon the composition of the chemical agent ore related compound being burned. In this case the ratio of fuel to CWA or related compound burned in-cylinder will depend on how easily the CWA or related compound combusts and the overall anti-knock index of the mixture. For example, if the CWA or related compound does not combust easily or if the anti-knock index of the resulting mixture is too low for the desired operational condition, then a greater amount of fuel will be utilized to either increase the overall combustibility of the mixture or raise the anti-knock index of the mixture. In embodiments engine oil is monitored by in-line sensors and can be continuously replaced if reaction with acid gas combustion products reaches a critical level, e.g. to the point of degrading the engine oil beyond its ability to provide functional lubrication or to a point where the oil becomes excessively hazardous from a safety standpoint. Valves and conduits may also be fitted with corrosion resistant alloys to avoid premature engine failure due to exposure to acid gas combustion products.

In another embodiment, a spark initiated ICE burning gasoline fuel is used to consume chemical warfare agents and/or related compounds herein without the use of D-EGR. In this engine configuration, fuel and CWA and/or related compound are preferably directly injected into the cylinder combustion chamber, injected into the intake port, or a combination thereof, depending upon the composition of the CWA and/or related compound being burned. As before, the ratio of fuel to CWA and/or related compound burned in-cylinder depends upon how easily the CWA and/or related compound combusts and the overall anti-knock index of the mixture. For example, if the CWA and/or related compound does not combust easily or if the anti-knock index of the resulting mixture is too low for the desired operational condition, then a greater amount of fuel will be utilized to either increase the overall combustibility of the mixture or raise the anti-knock index of the mixture. Engine oil may again be monitored by in-line sensors and can be continuously replaced if reaction with acid gas combustion products reaches a critical level, e.g. to the point of degrading the engine oil beyond its ability to provide functional lubrication or to a point where the oil becomes excessively hazardous from a safety standpoint. Likewise, valves and conduits may also be fitted with corrosion resistant alloys to avoid premature engine failure due to exposure to acid gas combustion products.

In another embodiment a compression initiated diesel ICE is employed to burn an auto-ignitable fuel mixture of diesel fuel and one or more CWA and/or related compounds. In this embodiment, the fuel mixture has a cetane number in line with traditional diesel fuels, e.g. between about 48-50, and is introduced: into a diesel supply line and through the stock diesel fuel injection system; to axillary port fuel injectors; or through a parallel diesel type injection system. In any of those configurations the fuel mixture is supplied to one or more cylinders. The high pressures and temperatures reached at top dead center of the piston (e.g. temperatures in the range of 600 K to 2600 K and pressures in the range of 20 bar to 250 bar) facilitate combustion of the diesel fuel/chemical warfare agent mixtures.

When a diesel engine is used, advancing combustion (i.e. moving combustion earlier in the rotational cycle) may be employed to enhance (e.g., maximize) in-cylinder heat and pressure (within engine design limits) to consume the CWA and/or related compounds in the fuel more thoroughly, while decreasing power output of the engine. It also reduces the amount of shaft work load that must be dissipated in order to maintain CWA and/or related compound combustion. For example, advancing combustion past the typically optimum crank angle can reduces combustion efficiency, resulting in a higher fuel flow for the same brake power. This also makes temperatures higher for longer in-cylinder, which in turn increases the efficiency with which the CWAs and/or related compounds is/are combusted. Further—less load is needed for the engine to use the same fuel flow rate, which helps to keep the system size down while also keeping CWAs and/or related compounds throughput up. Notably, in this combustion configuration the engine radiator has to exhaust more heat and, thus, a larger radiator may be used. It is also noted that combustion should not be advanced past the point where the Brake Mean Effective Pressure (BMEP) is no longer positive, or to where peak cylinder pressure exceeds the in-cylinder pressure limit of the engine.

As discussed above in connection with FIG. 1, the engine is preferably configured to provide power output to one or more components, such as an electric generator, air compressor, hydraulic pump, refrigeration unit, or the like. One or more of such components may be connected to the engine by a common drive train to place a load on the engine and produce power while the engine consumes the CWAs and/or the related compounds noted herein. The power generated can be used for various purposes, such as to operate system sensors/controls, drive heaters, and run the balance of the plant systems upstream and downstream of the engine. In embodiments, the engine may also be a primary drive engine of an automobile, or an engine running on a fixed location or mobile platform mount.

In embodiments, the engines described herein utilize dual fuel control to maintain engine operation and power during CWA and/or related compound consumption. In such embodiments, provision of standard hydrocarbon fuel (gasoline, diesel, etc.) to the engine is electronically controlled to maintain combustion, enhance combustion, or not at all if combustion is doing fine without the use of standard fuel. Control over the addition of hydrocarbon fuel may be performed by a controller, which may perform calculations on a crank angle basis and time basis. For example, the controller may calculate in-cylinder temperature on a half degree basis, which limits the multiplications to about 720 (360 degrees) with 360 degrees covering the entire compression and expansion stroke. It also allows for cycle-by-cycle tracking of combustion performance suitable for destruction performance reporting and closed-loop feedback control of the combustion process through using the calculated in-cylinder temperatures and the known temperature dependent reaction rate constants of the given CWA and/or related compound to estimate the destruction efficiency.

In embodiments the systems and methods herein use or include components (e.g., an exhaust management system) that are designed to improve the quality of the engine exhaust gas and lower the amount of residual CWA or related compound in the exhaust gas stream produced by the ICE. For example, in embodiments the system and methods employ an exhaust pipe (e.g. exhaust pipe with a volume in the range of 0.5 $ft^3$ to 75 $ft^3$) that is sized to provide a sufficient residence time (e.g. residence time of 0.1-12 seconds) at high temperature (e.g. temperature of 550-700° C.). The exhaust pipe may be used as is or with the optional addition of excess oxygen to degrade any residual CWA and/or related components—thereby providing an additional safety margin to the goal of consuming the CWAs and/or related components that are supplied to the engine.

In some embodiments, the system and methods described herein include an insulated engine exhaust manifold and insulated piping. In such embodiments, no additional heat is applied. Rather, in this arrangement hot exhaust from the engine heats the exhaust manifold and piping during system warm-up, and maintains the high temperature in the exhaust piping in a temperature gradient that is hottest at the engine, and cooler as distance from the engine increases. The piping diameter and length can be selected to match a desired volumetric retention time at high temperatures. Non-limiting examples of suitable piping diameters that may be used are in the range of 2-24 inches at a length in the range of 5-14 feet. In such embodiments the engine exhaust temperature may range from about 350° C. to 700° C., depending on the engine configuration and operation.

In other embodiments a secondary heat source is used in conjunction with (e.g., added to) an insulated exhaust manifold and piping as the "Secondary Thermal Zone" in FIG. 1. Non-limiting examples of secondary heat sources that may be used include high temperature electrical resistance heat tape; injection of CWA (and/or related compounds) and air directly into the exhaust creating an afterburner; a propane burner; an electrical resistance air torch with high temperature excess air added to the system; combinations thereof, and the like. Such secondary heat sources may be used to bring exhaust gas temperatures into the range of about 900° C. to about 1200° C.

As noted above the exhaust gas produced by the combustion of CWA and/or related compounds by an ICE can contain significant amounts of acid gases. With that in mind, in embodiments the systems and methods described herein remove (scrub) acid gases (or proxies thereof) from the engine exhaust. For example, exhaust gas produced by the ICE may contain tens of parts-per-thousand (tens of thousands of parts-per-million; e.g., 50,000 ppm) of acid gases. After scrubbing, the content of such exhaust gases in the exhaust gas stream may be reduced to levels below the Occupational Safety and Health Administration (OSHA) standards for those acid gases, e.g., less than 3 ppm HF, less than 5 ppm HCl, etc.

In further embodiments, the ICE exhaust may be scrubbed in sequence by a fluidized bed reactor (FBR) that is upstream of one or more packed bed scrubbers (PBS), which may be connected in sequence or in parallel. The powders (scrubbing media) used in the FBR and PBS may be in the form of soil, e.g., which may be obtained locally from the location at which a system described herein is installed, or which is remotely sourced. For example, calcareous soils obtained locally (at or near the site at which the CWA or are stored) may be used as absorbent materials in an FBR and/or PBS.

In such instances the soil may contain a relatively high amount (e.g. from about 25% to about 75%) of CaO, Ca(OH)$_2$ or CaCO$_3$ or other basic solids for sequestering of acid gas components. Soils that include calcium silicates may also be used (alone or in addition to the above compounds) due to their ready reaction with HF. In embodiments, topsoil is used in an FBR or PBS. In such instances the topsoil may contain relatively high concentrations (e.g. 5% or more) of humic acids, which are useful for scrubbing the exhaust gas due to their synergistic scrubbing of acid gas components with basic inorganic components. Alternatives to basic calcium salts include Li$_2$O which has a high basicity-to-weight ratio. Alternatively or in addition to soil, commercially supplied basic powders could also be used in the FBR and PBS.

Additional filters such as a bag houses may be also placed in the exhaust air stream to eliminate fine particle contamination of the flow system and maintain proper pressure drop across all the unit operations consistent with the vacuum driven exhaust flow, while avoiding vacuum pump contamination. Data obtained from such a system (engine fueled by an organophosphate and hydrocarbon fuel mixture, soil-filled FBR, soil-filled PBS) resulted in acid gas removal greater than 99.9% until the soil CaCO$_3$ capacity was depleted (at about 5% wt. acid gas load).

P$_2$O$_5$ (P$_4$O$_{10}$) vapor is typically formed by the combustion of organophosphorus CWAs. To scrub such vapor, an FBR operated at high temperature may be used to avoid condensation of polyphosphoric acids formed by the reaction of P$_2$O$_5$ (P$_4$O$_{10}$) with exhaust water vapor which can corrode metal parts and lead to agglomeration of the scrubbing bed powders. For example, an FBR operated at >400° C. may be used.

In embodiments an FBR utilizing an FBR powder consisting of unagglomerated $CaCO_3$ (aragonite or limestone) and hydrated lime (CaO, $Ca(OH)_2$) of particle size 50-100 μm is used. One purpose of such an FBR is to remove phosphates and $SO_2$ by conversion to $CaSO_3$, and then by surface catalyzed oxidation to $CaSO_4$. Notably, $CaSO_4$ will not react with the strong acids HCl and HF to regenerate $SO_2$, and thus decreases the breakthrough volume of $SO_2$. The mechanical properties of the particles may also be important, since abrasion of the particles during FBR can produce fines that can compromise the function of the FBR and contaminate downstream units.

In further embodiments, a container such as the bed of a dump truck, a roll-off box, and semi-trailer dirt haulers, or the like may be employed to scrub acid gases from the ICE exhaust in manner similar in concept to that of a PBS. For example, a container loaded with pre-sized soil could be used for that purpose. In such instances engine exhaust may be percolated through an exhaust gas sparger arrangement in the bottom of the container (e.g., the bottom of a dump truck bed). In such embodiments, no FBR or PBS is used. Rather, the container is loaded with a sufficient amount of pre-sized soil (e.g. about 7 to about 21 tons) that is arranged around the engine exhaust manifold and sparger, wherein the sparger includes multiple (e.g., downward facing) holes. Engine exhaust gas flows through the sparger and pushes up through the soil and vents at the soil surface at the top of the container. As the exhaust gas passes through the soil, acid gases are captured by the (e.g., calcareous) soil and retained therein. Advantage of this arrangement include rapid filling and draining of the scrubber, as well as allowing for delocalization of soil collection and soil disposal. In instances where the correct soil type for acid gas scrubbing is not be available locally to the system, remote collection of an appropriate soil may be performed before the system is used. In any case, uses soli may be disposed of locally or remotely from the system.

Air monitoring at the soil surface in the top of the container (e.g., at the top of a dump truck bed) may be employed to detect acid gas rise due to soil capacity depletion. At a threshold detection limit, soil within the container may be removed, and new soil may be provided for continued system operation.

In further embodiments, an alkaline wet scrubber (AWS) is used to neutralize acid gases in the exhaust gas stream. In a relatively simple configuration, an alkaline solution (KOH, NaOH, $Ca(OH)_2$, LiOH, $Na_2O$. $Li_2O$ etc.) is used in a Venturi scrubber to scrub acid gases from the exhaust gas stream. A tower demister is then used to remove entrained alkaline solution from the exhaust gas stream prior to release of the exhaust gas stream into the atmosphere.

In further embodiments, a gas-phase reaction with ammonia is used to convert acid gases in the engine exhaust with into solid ammonium salts, which are then filtered or scrubbed from the exhaust gas stream. In many instances ammonia ($NH_3$) gas reacts with acid gases, e.g., HCl, to form solid ammonium chloride salts (e.g., $NH_4Cl$), which have relatively low sublimation temperatures and dissociation temperatures. To create and drop-out ammonium salts for the exhaust gas stream produced by an ICE consistent with the present disclosure, a heat exchanger is installed after the secondary thermal zone shown in FIG. 1, and is used to lower the exhaust gas temperature down to approximately 120° C. Ammonia is injected into the engine exhaust upstream of the heat exchanger. Following injection, the ammonia reacts with the acid gas in the heat exchanger when the temperature drops to a thermodynamically favorable level for the given salt formation (e.g., 338° C. for HCl and $NH_3$ to make $NH_4Cl$; 168° C. for HF and $NH_3$ to make $NH_4F$; etc.). When present, $P_2O_5$ in the heat exchanger combines with water vapor to form phosphoric acid variations, as well as combining with ammonia to form ammonium phosphate salts of varying complexity. In any case, solid ammonium salts and phosphate semi-solid phosphates may be separated from the exhaust gas stream via any suitable means, such as with a cyclone followed by a filter.

In any of the foregoing embodiments, the systems and methods herein may use or include in situ gas monitoring systems. Any suitable type of gas monitoring system may be used, and such systems may be placed at any suitable location. For example, gas monitoring systems including one or more spectroscopic detectors may be located before and after each unit of the system described herein. In any case, the gas monitoring systems may provide a sensor signal to a controller, which can use information in the signal to adjust flow rates, temperatures, and other system parameters, so as to obtain desired system operation.

The following examples pertain to further embodiments of the present disclosure.

EXAMPLES

Example 1

According to this example there is provided a combustion system, including: an internal combustion engine; and a fuel source for providing a fuel to the internal combustion engine, wherein the fuel includes at least one chemical warfare agent (CWA), related compound, or a combination thereof; wherein the internal combustion engine is configured to combust the fuel to produce an exhaust gas stream.

Example 2

This example includes any or all of the features of example 1, wherein the internal combustion engine is selected from the group consisting of a spark initiated internal combustion engine with dedicated exhaust gas recirculation, a spark initiated internal combustion engine without dedicated exhaust gas recirculation, and a diesel engine.

Example 3

This example includes any or all of the features of example 1, wherein the fuel is a fuel blend including at least one hydrocarbon fuel and the at least one CWA, related compound, or a combination thereof.

Example 4

This example includes any or all of the features of example 3, wherein the fuel blend is selected from the group consisting of: a blend of gasoline and the at least one CWA, related compound, or a combination thereof; and a blend of diesel and the at least one CWA, related compound, or a combination thereof.

Example 5

This example includes any or all of the features of example 3, wherein the fuel blend includes from about 10% by weight to less than 100% by weight of the at least one CWA, related compound, or a combination thereof is present in the, balance hydrocarbon fuel.

Example 6

This example includes any or all of the features of example 1, wherein the at least one CWA, related compound, or a combination thereof includes at least one compound selected from the group consisting of: O-Alkyl alkyl (Me, Et, n-Pr or i-Pr)-phosphorofluoridates; O-Alkyl N,N-dialkyl (Me, Et, n-Pr or i-Pr) phosphoramidocyanidates; and O-Alkyl S-2-dialkyl (Me, Et, n-Pr or i-Pr)-aminoethyl alkyl (Me, Et, n-Pr or i-Pr) phosphonothiolates, and corresponding alkylated or protonated salts.

Example 7

This example includes any or all of the features of example 6, wherein the at least one CWA, related compound, or a combination thereof includes at least one compound selected from the group consisting of: O-Isopropyl methylphosphonofluoridate; O-Pinacolyl methylphosphonofluoridate; O-Ethyl N,N-dimethyl phosphoramidocyanidate; and O-Ethyl S-2-diisopropylaminoethyl methyl phosphonothiolate.

Example 8

This example includes any or all of the features of example 1, wherein the at least one CWA, related compound, or a combination thereof includes a sulfur mustard, a nitrogen mustard, or a combination thereof.

Example 9

This example includes any or all of the features of example 8, wherein the at least one CWA, related compound, or a combination thereof includes a sulfur mustard selected from the group consisting of: 2-Chloroethylchloromethylsulfide; Bis(2-chloroethyl) sulfide; Bis(2-chloroethylthio)methane; 1,2-Bis(2-chloroethylthio)ethane; 1,3-Bis(2-chloroethylthio)-n-propane; 1,4-Bis(2-chloroethylthio)-n-butane; 1,5-Bis(2-chloroethylthio)-n-pentane; Bis(2-chloroethylthiomethyl)ether; and Bis(2-chloroethylthioethyl)ether.

Example 10

This example includes any or all of the features of example 8, wherein the at least one CWA, related compound, or a combination thereof includes a nitrogen mustard selected from the group consisting of: HN1: Bis(2-chloroethyl)ethylamine; HN2: Bis(2-chloroethyl)methylamine; HN3: Tris(2-chloroethyl)amine.

Example 11

This example includes any or all of the features of example 1, wherein the at least one CWA, related compound, or a combination thereof includes at least one compound selected from the group consisting of: Carbonyl dichloride; Cyanogen chloride; Hydrogen cyanide; Trichloronitromethane; and 3-Quinuclidinyl benzilate.

Example 12

This example includes any or all of the features of example 1, wherein the at least one CWA, related compound, or a combination thereof includes at least one precursor selected from the group consisting of Alkyl (Me, Et, n-Pr or i-Pr) phosphonyldifluorides; O-Alkyl (H or <=C10, incl. cycloalkyl) O-2-dalkyl (Me, Et, n-Pr or i-Pr)-aminoethyl alkyl (Me, Et, n-Pr or i-Pr) phosphonites and corresponding alkylated or protonated salts; O-Ethyl O-2-diisopropylaminoethyl methylphosphonite; O-Isopropyl methylphosphonochloridate; O-Pinacolyl methylphosphonochloridate; O,O-Diethyl S-[2-(diethylamino)ethyl] phosphorothiolate and corresponding alkylated or protonated salts; and 1,1,3,3-Pentafluoro-2-(trifluoromethyl)-1-propene.

Example 13

This example includes any or all of the features of example 1, wherein the at least one CWA, related compound, or a combination thereof includes one or more compounds that contain a phosphorous atom to which is bonded to one methyl, ethyl, or propyl group, but not to any additional carbon atoms.

Example 14

This example includes any or all of the features of example 13, wherein the at least one CWA, related compound, or a combination thereof includes at least one compound selected from the group consisting of Methylphosphonyl dichloride; Dimethyl methylphosphonate; O-Ethyl S-phenyl ethylphosphonothiolothionate; N,N-Dialkyl (Me, Et, n-Pr or i-Pr) phosphoramidic dihalides; Dialkyl (Me, Et, n-Pr or i-Pr) N,N-dialkyl (Me, Et, n-Pr or i-Pr)-phosphoramidates; N,N-Dialkyl (Me, Et, n-Pr or i-Pr) aminoethyl-2-chlorides and corresponding protonated salts; N,N-Dialkyl (Me, Et, n-Pr or i-Pr) aminoethane-2-ols and corresponding protonated salts; N,N-Dialkyl (Me, Et, n-Pr or i-Pr) aminoethane-2-thiols and corresponding protonated salts; Bis(2-hydroxyethyl) sulfide; 3,3-Dimethylbutan-2-ol; Trimethyl phosphite; Triethyl phosphite; Dimethyl phosphite; Diethyl phosphite; Sulfur monochloride; Sulfur dichloride; Thionyl chloride; Ethyldiethanolamine; Methyldiethanolamine; and Triethanolamine.

Example 15

According to this example there is provided a combustion system including: an internal combustion engine; and a fuel source for providing a fuel to the internal combustion engine, wherein the fuel includes at least one pesticide wherein the internal combustion engine is configured to combust the fuel to produce an exhaust gas stream. A pesticide is understood as a substance to control pests, including weeds, and therefore include herbicides and insecticides. Pesticides herein therefore include glyphosate (N-(phosphonomethyl)glycine) and their salts (e.g., the isopropylamine salt of glycophosphate) and 2,4-dichlorophenoxyacetic acid, otherwise known as 2,4-D. Other herbicides include aminopyralid, chlorsulfuron, dicamba, diuron, hexazinone, imazapic, imazapyr and methsulfuron-methyl.

Example 16

This example includes any or all of the features of example 4, wherein the fuel includes a blend of diesel and the at least one CWA, related compound, or a combination thereof, and the system further includes an injection system and a controller, wherein: the injection system is configured to provide the fuel to the engine; and the controller is configured to control operating parameters of the engine and a relative amount of diesel and the at least one CWA, related compound, or a combination thereof provided in the fuel, so as to manage an efficiency with which the fuel is combusted by the engine.

Example 17

This example includes any or all of the features of example 16, wherein the controller is configured to adjust the relative amount of diesel and the at least one CWA, related compound, or a combination thereof provided in the fuel to adjust one or more burning characteristics of the fuel.

Example 18

This example includes any or all of the features of example 16, wherein the engine is configured to combust at least a portion of the fuel by autoignition.

Example 19

This example includes any or all of the features of example 1, further including an injection system and a controller, wherein: the injection system is configured to provide the fuel to the engine; and the controller is configured to reduce cylinder wall wetting in the engine by the at least one CWA, related compound, or a combination thereof in the fuel, through the control of at least one of fuel injection timing, duration, and pressure.

Example 20

This example includes any or all of the features of example 1, further including a secondary thermal zone coupled downstream of the engine, wherein: in operation, the exhaust gas stream is routed through the secondary thermal zone; and the secondary thermal zone is configured to thermally decompose at least a portion of any residual amount of the at least one CWA, related compound, or combination thereof.

Example 21

This example includes any or all of the features of example 1, wherein the exhaust gas stream includes an acid gas, and the system further includes a scrubber to remove at least a portion of the acid gas from the exhaust gas stream.

Example 22

This example includes any or all of the features of example 21, further including a secondary thermal zone coupled downstream of the engine, wherein: in operation, the exhaust gas stream is routed through the secondary thermal zone; the secondary thermal zone is configured to thermally decompose at least a portion of any residual amount of the at least one CWA, related compound, or combination thereof; the scrubber removes the acid gas from the exhaust gas stream downstream of the secondary thermal zone.

Example 23

This example includes any or all of the features of example 21, wherein the exhaust gas stream downstream of the scrubber includes less than 5 parts per million of acid gases.

Example 24

This example includes any or all of the features of example 21, wherein the scrubber includes at least one fluidized bed reactor (FBR), packed bed scrubber (PBS), or a combination thereof.

Example 25

This example includes any or all of the features of example 24, wherein the scrubber includes a FBR upstream of at least one PBS.

Example 26

This example includes any or all of the features of example 25, wherein the FBR, the PBS, or both the FBR and the PBS utilizing a scrubbing media to remove acid gas from the exhaust gas stream, wherein the scrubbing media includes soil.

Example 27

This example includes any or all of the features of example 26, wherein the soil is a calcareous soil including from about 25% to about 75% of basic solids.

Example 28

This example includes any or all of the features of example 26, wherein the soil is topsoil including greater than or equal to 5% of humic acids.

Example 29

This example includes any or all of the features of example 25, wherein the FBR, the PBS, or both the FBR and the PBS utilizing a scrubbing media to remove acid gas from the exhaust gas stream, wherein the scrubbing media consists of unagglomerated particles of $CaCO_3$ (aragonite or limestone) and hydrated lime (CaO, $Ca(OH)_2$), with a particle size 50-100 microns (μm).

Example 30

This example includes any or all of the features of example 21, wherein the scrubber includes a container and a scrubbing media within the container, and the container is selected from a bed of an automobile, a roll-off box, a dirt hauling trailer, or a combination thereof.

Example 31

This example includes any or all of the features of example 21, wherein the scrubber includes an alkaline wet scrubber configured to neutralize the acid gas.

Example 32

This example includes any or all of the features of example 2, wherein: the engine is a spark initiated internal combustion engine with dedicated exhaust gas recirculation; and the engine including first and second cylinder types; the first cylinder type burn hydrocarbon fuel under rich conditioned to produce an exhaust containing a mixture of CO and $H_2$, which is injected into the second cylinder type; and the second cylinder type burns a mixture of hydrocarbon fuel at the at least one CWA, related compound, or combination thereof under lean conditions.

Example 33

This example includes any or all of the features of example 2, further including an injection system, wherein: the engine further includes at least one cylinder and at least one intake port; and the injection system is configured to direct inject the fuel into the at least one cylinder, the at least one intake port, or a combination thereof.

Example 34

This example includes any or all of the features of example 33, further including a controller, an engine oil monitor, and an engine oil supply, wherein: the fuel includes a blend of hydrocarbon fuel and the at least one CWA, related compound, or combination thereof; and the controller is configured to adjust a ratio of the hydrocarbon fuel to the at least one CWA, related compound, or combination to control an efficiency of the combustion of the fuel; the engine oil monitor is configured to monitor a degradation level of the engine oil, and causes replacement of the engine oil from the engine oil supply when it is determined that degradation of the engine oil has exceeded a threshold level.

Example 35

According to this example there is provided a method for combusting hazardous compounds, including: supplying fuel from a fuel source to an internal combustion engine; and combusting the fuel in the internal combustion engine to produce an exhaust gas stream; wherein the fuel includes at least one chemical warfare agent (CWA), related compound, or a combination thereof.

Example 36

This example includes any or all of the features of example 35, wherein the internal combustion engine is selected from the group consisting of a spark initiated internal combustion engine with dedicated exhaust gas recirculation, a spark initiated internal combustion engine without dedicated exhaust gas recirculation, and a diesel engine.

Example 37

This example includes any or all of the features of example 35, wherein the fuel is a fuel blend including at least one hydrocarbon fuel and the at least one CWA, related compound, or a combination thereof.

Example 38

This example includes any or all of the features of example 37, wherein the fuel blend is selected from the group consisting of: a blend of gasoline and the at least one CWA, related compound, or a combination thereof; and a blend of diesel and the at least one CWA, related compound, or a combination thereof.

Example 39

This example includes any or all of the features of example 37, wherein the fuel blend includes from about 10% by weight to less than 100% by weight of the at least one CWA, related compound, or a combination thereof is present in the, balance hydrocarbon fuel.

Example 40

This example includes any or all of the features of example 35, wherein the at least one CWA, related compound, or a combination thereof includes at least one compound selected from the group consisting of: O-Alkyl alkyl (Me, Et, n-Pr or i-Pr)-phosphonofluoridates; O-Alkyl N,N-dialkyl (Me, Et, n-Pr or i-Pr) phosphoramidocyanidates; and O-Alkyl S-2-dialkyl (Me, Et, n-Pr or i-Pr)-aminoethyl alkyl (Me, Et, n-Pr or i-Pr) phosphonothiolates, and corresponding alkylated or protonated salts.

Example 41

This example includes any or all of the features of example 40, wherein the at least one CWA, related compound, or a combination thereof includes at least one compound selected from the group consisting of: O-Isopropyl methylphosphonofluoridate; O-Pinacolyl methylphosphonofluoridate; O-Ethyl N,N-dimethyl phosphoramidocyanidate; and O-Ethyl S-2-diisopropylaminoethyl methyl phosphonothiolate.

Example 42

This example includes any or all of the features of example 35, wherein the at least one CWA, related compound, or a combination thereof includes a sulfur mustard, a nitrogen mustard, or a combination thereof.

Example 43

This example includes any or all of the features of example 42, wherein the at least one CWA, related compound, or a combination thereof includes a sulfur mustard selected from the group consisting of: 2-Chloroethylchloromethylsulfide; Bis(2-chloroethyl) sulfide; Bis(2-chloroethylthio)methane; 1,2-Bis(2-chloroethylthio)ethane; 1,3-Bis(2-chloroethylthio)-n-propane; 1,4-Bis(2-chloroethylthio)-n-butane; 1,5-Bis(2-chloroethylthio)-n-pentane; Bis(2-chloroethylthiomethyl)ether; and Bis(2-chloroethylthioethyl)ether.

Example 44

This example includes any or all of the features of example 42, wherein the at least one CWA, related compound, or a combination thereof includes a nitrogen mustard selected from the group consisting of: HN1: Bis(2-chloroethyl)ethylamine; HN2: Bis(2-chloroethyl)methylamine; HN3: Tris(2-chloroethyl)amine.

Example 45

This example includes any or all of the features of example 35, wherein the at least one CWA, related compound, or a combination thereof includes at least one compound selected from the group consisting of: Carbonyl dichloride; Cyanogen chloride; Hydrogen cyanide; Trichloronitromethane; and 3-Quinuclidinyl benzilate.

Example 46

This example includes any or all of the features of example 35, wherein the at least one CWA, related compound, or a combination thereof includes at least one precursor selected from the group consisting of Alkyl (Me, Et, n-Pr or i-Pr) phosphonyldifluorides; O-Alkyl (H or <=C10, incl. cycloalkyl) O-2-dalkyl (Me, Et, n-Pr or i-Pr)-aminoethyl alkyl (Me, Et, n-Pr or i-Pr) phosphonites and corresponding alkylated or protonated salts; O-Ethyl O-2-diisopropylaminoethyl methylphosphonite; O-Isopropyl methylphosphonochloridate; O-Pinacolyl methylphosphonochloridate; O,O-Diethyl S-[2-(diethylamino)ethyl] phosphorothiolate and corresponding alkylated or protonated salts; and 1,1,3,3,3-Pentafluoro-2-(trifluoromethyl)-1-propene.

Example 47

This example includes any or all of the features of example 35, wherein the at least one CWA, related compound, or a combination thereof includes one or more compounds that contain a phosphorous atom to which is bonded to one methyl, ethyl, or propyl group, but not to any additional carbon atoms.

Example 48

This example includes any or all of the features of example 47, wherein the at least one CWA, related compound, or a combination thereof includes at least one compound selected from the group consisting of Methylphosphonyl dichloride; Dimethyl methylphosphonate; O-Ethyl S-phenyl ethylphosphonothiolothionate; N,N-Dialkyl (Me, Et, n-Pr or i-Pr) phosphoramidic dihalides; Dialkyl (Me, Et, n-Pr or i-Pr) N,N-dialkyl (Me, Et, n-Pr or i-Pr)-phosphoramidates; N,N-Dialkyl (Me, Et, n-Pr or i-Pr) aminoethyl-2-chlorides and corresponding protonated salts; N,N-Dialkyl (Me, Et, n-Pr or i-Pr) aminoethane-2-ols and corresponding protonated salts; N,N-Dialkyl (Me, Et, n-Pr or i-Pr) aminoethane-2-thiols and corresponding protonated salts; Bis(2-hydroxyethyl) sulfide; 3,3-Dimethylbutan-2-ol; Trimethyl phosphite; Triethyl phosphite; Dimethyl phosphite; Diethyl phosphite; Sulfur monochloride; Sulfur dichloride; Thionyl chloride; Ethyldiethanolamine; Methyldiethanolamine; and Triethanolamine.

Example 49

This example includes any or all of the features of example 35, wherein the at least one CWA, related compound, or a combination thereof includes one or more than one of a pesticide.

Example 50

This example includes any or all of the features of example 38, wherein the fuel includes a blend of diesel and the at least one CWA, related compound, or a combination thereof, and the method further includes: providing the fuel to the engine with an injection system; and controlling, with a controller, operating parameters and a relative amount of diesel and the at least one CWA, related compound, or a combination thereof provided in the fuel, so as to manage an efficiency with which the fuel is combusted by the engine.

Example 51

This example includes any or all of the features of example 50, wherein the controlling including adjusting the relative amount of diesel and the at least one CWA, related compound, or a combination thereof provided in the fuel to adjust one or more burning characteristics of the fuel.

Example 52

This example includes any or all of the features of example 50, wherein the combusting includes combusting at least a portion of the fuel by autoignition.

Example 53

This example includes any or all of the features of example 35, further including: providing the fuel to the engine with an injection system; and controlling, with a controller, at least one of fuel injection timing, duration, and pressure reducing to reduce cylinder wall wetting in the engine by the at least one CWA, related compound, or a combination thereof in the fuel.

Example 54

This example includes any or all of the features of example 35, further including: routing the exhaust gas stream through a secondary thermal zone; and thermally decomposing, within the secondary thermal zone, at least a portion of any residual amount of the at least one CWA, related compound, or combination thereof.

Example 55

This example includes any or all of the features of example 35, wherein the exhaust gas stream includes an acid gas and the method further includes removing at least a portion of the acid gas from the exhaust gas stream with a scrubber.

Example 56

This example includes any or all of the features of example 65, further including: routing the exhaust gas stream through a secondary thermal zone; thermally decomposing, within the secondary thermal zone, at least a portion of any residual amount of the at least one CWA, related compound, or combination thereof to produce a treated exhaust gas stream; and routing the treated exhaust gas stream through the scrubber.

Example 57

This example includes any or all of the features of example 55, wherein the exhaust gas stream downstream of the scrubber includes less than 5 parts per million of acid gases.

Example 58

This example includes any or all of the features of example 55, wherein the scrubber includes at least one fluidized bed reactor (FBR), packed bed scrubber (PBS), or a combination thereof.

Example 59

This example includes any or all of the features of example 58, wherein the scrubber includes a FBR upstream of at least one PBS.

Example 60

This example includes any or all of the features of example 58, wherein: the FBR, the PBS, or both the FBR and the PBS comprise a scrubbing media; the removing at least a portion of the acid gas from the exhaust gas stream is performed with the scrubbing media; and the scrubbing media includes soil.

Example 61

This example includes any or all of the features of example 60, wherein the soil is a calcareous soil including from about 25% to about 75% of basic solids.

Example 62

This example includes any or all of the features of example 60, wherein the soil is topsoil including greater than or equal to 5% of humic acids.

Example 63

This example includes any or all of the features of example 58, wherein: the FBR, the PBS, or both the FBR and the PBS comprise a scrubbing media; the removing at least a portion of the acid gas from the exhaust gas stream is performed with the scrubbing media; and the scrubbing media consists of unagglomerated particles of $CaCO_3$ (aragonite or limestone) and hydrated lime (CaO, $Ca(OH)_2$), with a particle size 50-100 microns (μm).

Example 64

This example includes any or all of the features of example 55, wherein the scrubber includes a container and a scrubbing media within the container, and the container is selected from a bed of an automobile, a roll-off box, a dirt hauling trailer, or a combination thereof.

Example 65

This example includes any or all of the features of example 55, wherein the scrubber includes an alkaline wet scrubber configured to neutralize the acid gas.

Example 66

This example includes any or all of the features of example 36, wherein: the engine is a spark initiated internal combustion engine with dedicated exhaust gas recirculation; and the engine including first and second cylinder types; the first cylinder type burn hydrocarbon fuel under rich conditioned to produce an exhaust containing a mixture of CO and $H_2$, which is injected into the second cylinder type; and the second cylinder type burns a mixture of hydrocarbon fuel at the at least one CWA, related compound, or combination thereof under lean conditions.

Example 67

This example includes any or all of the features of example 36, wherein: the engine further includes at least one cylinder and at least one intake port; and supplying the fuel includes directly injecting the fuel into the at least one cylinder, the at least one intake port, or a combination thereof.

Example 68

This example includes any or all of the features of example 67, wherein the fuel includes a blend of hydrocarbon fuel and the at least one CWA, related compound, or combination thereof; and the method further includes: adjusting, with a controller, a ratio of the hydrocarbon fuel to the at least one CWA, related compound, or combination to control an efficiency of the combustion of the fuel; monitoring, with an oil monitor, a degradation level of engine oil used by the engine; and replacing at least a part of the engine oil when the oil monitor determines that degradation of the engine oil has exceeded a threshold level.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A combustion system, comprising:

an internal combustion engine; and a fuel source for providing a fuel to the internal combustion engine, wherein said fuel comprises at least one chemical warfare agent (CWA), CWA precursor or a combination thereof;

wherein said internal combustion engine is configured to combust said fuel to produce an exhaust gas stream;

wherein said CWA comprises one or more of the following:
O-Alkyl alkyl (Me, Et, n-Pr or i-Pr)-phosphorofluoridates; O-Alkyl N,N-dialkyl (Me, Et, n-Pr or i-Pr) phosphoramidocyanidates; and O-Alkyl S-2-dialkyl (Me, Et, n-Pr or i-Pr)-aminoethyl alkyl (Me, Et, n-Pr or i-Pr) phosphonothiolates, and corresponding alkylated or protonated salts;
O-Isopropyl methylphosphonofluoridate; O-Pinacolyl methylphosphonofluoridate; O-Ethyl N,N-dimethyl phosphoramidocyanidate; or O-Ethyl S-2-diisopropylaminoethyl methyl phosphonothiolate;
a sulfur mustard, a nitrogen mustard, or a combination thereof;
carbonyl dichloride; cyanogen chloride; hydrogen cyanide; trichloronitromethane; or 3-Quinuclidinyl benzilate.

2. The system of claim 1 wherein said CWA precursor comprises: alkyl (Me, Et, n-Pr or i-Pr) phosphonyldifluorides; O-Alkyl (H or <=C10, incl. cycloalkyl) O-2-dalkyl (Me, Et, n-Pr or i-Pr)-aminoethyl alkyl (Me, Et, n-Pr or i-Pr) phosphonites and corresponding alkylated or protonated salts; O-Ethyl O-2-diisopropylaminoethyl methylphosphonite; O-Isopropyl methylphosphonochloridate; O-Pinacolyl methylphosphonochloridate; O,O-Diethyl S-[2-(diethylamino)ethyl] phosphorothiolate and corresponding alkylated or protonated salts; or 1,1,3,3,3-Pentafluoro-2-(trifluoromethyl)-1-propene.

3. The system of claim 1 wherein said CWA precursor comprises: Methylphosphonyl dichloride; Dimethyl methylphosphonate; O-Ethyl S-phenyl ethylphosphonothiolothionate; N,N-Dialkyl (Me, Et, n-Pr or i-Pr) phosphoramidic dihalides; Dialkyl (Me, Et, n-Pr or i-Pr) N,N-dialkyl (Me, Et, n-Pr or i-Pr)-phosphoramidates; N,N-Dialkyl (Me, Et, n-Pr or i-Pr) aminoethyl-2-chlorides and corresponding protonated salts; N,N-Dialkyl (Me, Et, n-Pr or i-Pr) aminoethane-2-ols and corresponding protonated salts; N,N-Dialkyl (Me, Et, n-Pr or i-Pr) aminoethane-2-thiols and corresponding protonated salts; Bis(2-hydroxyethyl)sulfide; 3,3-Dimethylbutan-2-ol; Trimethyl phosphite; Triethyl phosphite; Dimethyl phosphite; Diethyl phosphite; Sulfur monochloride; Sulfur dichloride; Thionyl chloride; Ethyldiethanolamine; Methyldiethanolamine; or Triethanolamine.

4. The system of claim 1, wherein said internal combustion engine is selected from the group consisting of a spark initiated internal combustion engine with dedicated exhaust gas recirculation, a spark initiated internal combustion engine without dedicated exhaust gas recirculation, and a diesel engine.

5. The system of claim 1, wherein said fuel is a fuel blend comprising at least one hydrocarbon fuel and said at least one CWA, CWA precursor, or a combination thereof.

6. The system of claim 3, wherein said fuel blend is selected from the group consisting of:
a blend of gasoline and said at least one CWA, CWA precursor, or a combination thereof; and
a said secondary thermal zone is configured to thermally decompose at least a portion of any residual amount of said at least one CWA, CWA precursor, pesticide or combination thereof;

said scrubber removes said acid gas from said exhaust gas stream downstream of said secondary thermal zone.

13. The system of claim 11, wherein:

said scrubber includes at least one fluidized bed reactor (FBR), packed bed scrubber (PBS), or a combination thereof;

said FBR, said PBS, or both said FBR and said PBS utilizing a scrubbing media to remove acid gas from said exhaust gas stream; and said scrubbing media comprises soil.

14. A combustion system comprising:

an internal combustion engine and a fuel source wherein said fuel comprises at least one chemical warfare agent (CWA), CWA precursor, pesticide or combination thereof wherein said internal combustion engine is configured to combust said fuel to produce an exhaust gas stream;

said engine is a spark initiated internal combustion engine with dedicated exhaust gas recirculation; and said engine comprising first and second cylinder types;

the first cylinder type burns hydrocarbon fuel under rich conditions to produce an exhaust containing a mixture of CO and $H_2$, which is injected into the second cylinder type; and the second cylinder type burns a mixture of hydrocarbon fuel and said at least one CWA, CWA precursor, pesticide or combination thereof under lean conditions.

15. A combustion system comprising:

an internal combustion engine and a fuel source wherein said fuel comprises at least one chemical warfare agent (CWA), CWA precursor, pesticide or combination thereof wherein said internal combustion engine is configured to combust said fuel to produce an exhaust gas stream;

an injection system, a controller, an engine oil monitor, and an engine oil supply wherein:

said engine further comprises at least one cylinder and at least one intake port;

said injection system is configured to directly inject said fuel into said at least one cylinder, said at least one intake port, or a combination thereof;

the fuel comprises a blend of hydrocarbon fuel and said at least one CWA, CWA precursor, pesticide or combination thereof;

the controller is configured to adjust a ratio of said hydrocarbon fuel to said at least one CWA, related compound, or combination to control an efficiency of the combustion of said fuel; and said engine oil monitor is configured to monitor a degradation level of said engine oil, and causes replacement of said engine oil from said engine oil supply when it is determined that degradation of said engine oil has exceeded a threshold level.

16. A method for combusting hazardous compounds, comprising:

supplying fuel from a fuel source to an internal combustion engine; and combusting said fuel in said internal combustion engine to produce an exhaust gas stream;

wherein said fuel comprises at least one chemical warfare agent (CWA), CWA precursor or a combination thereof.

17. The method of claim 16 wherein said CWA comprises one or more of the following:

O-Alkyl alkyl (Me, Et, n-Pr or i-Pr)-phosphorofluoridates; O-Alkyl N,N-dialkyl (Me, Et, n-Pr or i-Pr) phosphoramidocyanidates; and O-Alkyl S-2-dialkyl (Me, Et, n-Pr or i-Pr)-aminoethyl alkyl (Me, Et, n-Pr or i-Pr) phosphonothiolates, and corresponding alkylated or protonated salts.

18. The method of claim 16 wherein said CWA comprises: O-Isopropyl methylphosphonofluoridate; O-Pinacolyl methylphosphonofluoridate; O-Ethyl N,N-dimethyl phosphoramidocyanidate; or O-Ethyl S-2-diisopropylaminoethyl methyl phosphonothiolate.

19. The method of claim 16 wherein said CWA comprises a sulfur mustard, a nitrogen mustard, or a combination thereof.

20. The method of claim 16 wherein said CWA comprises carbonyl dichloride; cyanogen chloride; hydrogen cyanide; trichloronitromethane; or 3-Quinuclidinyl benzilate.

21. The method of claim 16 wherein said CWA precursor comprises: alkyl (Me, Et, n-Pr or i-Pr) phosphonyldifluorides; O-Alkyl (H or <=C10, incl. cycloalkyl) O-2-dalkyl (Me, Et, n-Pr or i-Pr)-aminoethyl alkyl (Me, Et, n-Pr or i-Pr) phosphonites and corresponding alkylated or protonated salts; O-Ethyl O-2-diisopropylaminoethyl methylphosphonite; O-Isopropyl methylphosphonochloridate; O-Pinacolyl methylphosphonochloridate; O,O-Diethyl S-[2-(diethylamino)ethyl] phosphorothiolate and corresponding alkylated or protonated salts; or 1,1,3,3,3-Pentafluoro-2-(trifluoromethyl)-1-propene.

22. The method of claim 16 wherein said CWA precursor comprises: Methylphosphonyl dichloride; Dimethyl methylphosphonate; O-Ethyl S-phenyl ethylphosphonothiolothionate; N,N-Dialkyl (Me, Et, n-Pr or i-Pr) phosphoramidic dihalides; Dialkyl (Me, Et, n-Pr or i-Pr) N,N-dialkyl (Me, Et, n-Pr or i-Pr)-phosphoramidates; (Me, Et, n-Pr or i-Pr) aminoethyl-2-chlorides and corresponding protonated salts; N,N-Dialkyl (Me, Et, n-Pr or i-Pr) aminoethane-2-ols and corresponding protonated salts; N,N-Dialkyl (Me, Et, n-Pr or i-Pr) aminoethane-2-thiols and corresponding protonated salts; Bis(2-hydroxyethyl)sulfide; 3,3-Dimethylbutan-2-ol; Trimethyl phosphite; Triethyl phosphite; Dimethyl phosphite; Diethyl phosphite; Sulfur monochloride; Sulfur dichloride; Thionyl chloride; Ethyldiethanolamine; Methyldiethanolamine; or Triethanolamine.

* * * * *